United States Patent [19]

Ward et al.

[11] 4,142,240
[45] Feb. 27, 1979

[54] AGILE CODE GENERATOR

[75] Inventors: Charles R. Ward, Passaic; Robert A. Reilly, North Caldwell, both of N.J.

[73] Assignee: International Telephone & Telegraph Corp., Nutley, N.J.

[21] Appl. No.: 829,382

[22] Filed: Aug. 31, 1977

[51] Int. Cl.² .............................................. G06F 7/00
[52] U.S. Cl. ...................................... 364/717; 331/78
[58] Field of Search ........................... 364/717; 331/78

[56] References Cited

U.S. PATENT DOCUMENTS

| 3,761,696 | 9/1973 | Russell | 364/717 |
| 3,984,668 | 10/1976 | Zotterberg et al. | 364/717 |
| 4,047,008 | 9/1977 | Perkins | 364/717 |
| 4,058,673 | 11/1977 | Johansson | 364/717 X |

OTHER PUBLICATIONS

Coekin et al., "The Generation of Pseudo-Random Binary Sequences for Testing very wide Band Systems", Electronic Instrumentation Conference, Hobart, Australia, May 17-19, 1972, pp. 173-179.

Primary Examiner—David H. Malzahn
Attorney, Agent, or Firm—John T. O'Halloran; Alfred C. Hill

[57] ABSTRACT

The code generator of the present invention uses digital memories to replace the linear feedback shift registers of the prior art. Each memory contains the time ordered bit sequence for each of the component codes which in general, make up the overall, longer code. Since the entire bit sequences of the component codes are immediately available in the memories by appropriate addressing, the code generator can be initialized to an arbitrary, but defined code state within the response time of the memory element. As an additional benefit, at the option of the designer, the digital memory can be chosen to extract code segments, for example, 8 bits wide rather than single bits, and this parallel approach reduces code clocking speed through much of the code generator hardware, and/or may permit several code patterns for multichannel applications to be constructed using the same common memories.

6 Claims, 3 Drawing Figures

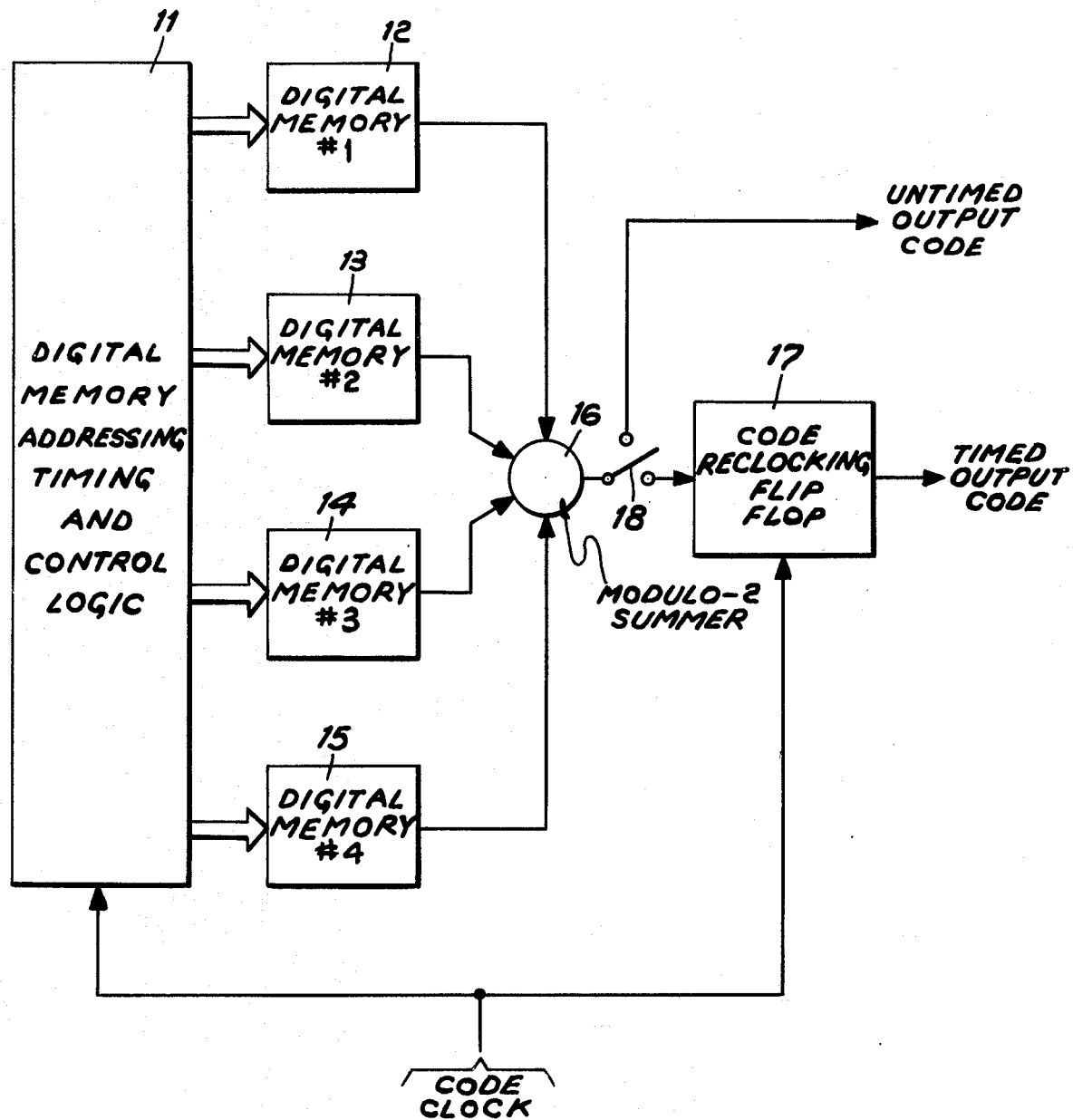

AGILE CODE GENERATOR

BACKGROUND OF THE INVENTION

This invention relates generally to code generators, and more particularly to code generators for secure and/or spread spectrum communication, navigation and/or data handling systems. Such systems employ code generators for the purpose of encoding and decoding signals or information to deny access to unauthorized parties, and also to realize a processing gain to help reject the degrading effects of interfering signals or information. The code pattern produced by the code generator is in general structured as Pseudo Random Noise (PRN).

Conventional PRN code generators employ digital linear feedback shift registers to generate specific PRN code sequences. Several of these code sequences may be combined in a prescribed manner to produce a unique non-repeating code of greater length. To preset or initialize the code generator to some arbitrary code state in the sequence involves predicting or calculating the binary states of the shift registers. This calculation is not easily performed, and the conventional technique requires that the shift registers be initialized to a known (non-arbitrary) code state (such as the epoch or "all ones" state) and then sequentially advancing the shift registers (by clocking) through the required number of code chips or bits until the required code state has been derived.

The construction and application of linear feedback shift registers for code generation are fully described in "Spread Spectrum Systems", by R. C. Dixon, published by John Wiley and Sons, Inc., 1976.

A major disadvantage of this conventional technique is the significant amount of time required to initialize the code generator to an arbitrary code state corresponding to some particular point in the overall code pattern produced by the code generator. This initialization time represents lost or wasted time since no code can be produced during these times.

SUMMARY OF THE INVENTION

It is an object of the present invention to provide a code generator which is highly agile from the standpoint of being able to be initialized to an arbitrary code state very rapidly.

It is a further object of the invention to achieve a high degree of code generator agility while at the same time not significantly increasing the size, weight, cost, complexity, and electrical power requirements from that of the conventional code generator.

A feature of the present invention is the provision of a highly agile code generator for encoding and decoding information in secure and spread spectrum communication, navigation and data handling systems comprising: first means for storing at least one binary code sequence; second means for addressing the first means; and third means for providing an output from the first means.

BRIEF DESCRIPTION OF DRAWING

The above and other objects of the invention will be more clearly understood from the following detailed description taken in conjunction with the accompanying drawings in which:

FIG. 3 is a block diagram of an agile code generator using digital memories in accordance with the principles of the present invention.

DESCRIPTION OF THE PREFERRED EMBODIMENT

Figure 1:
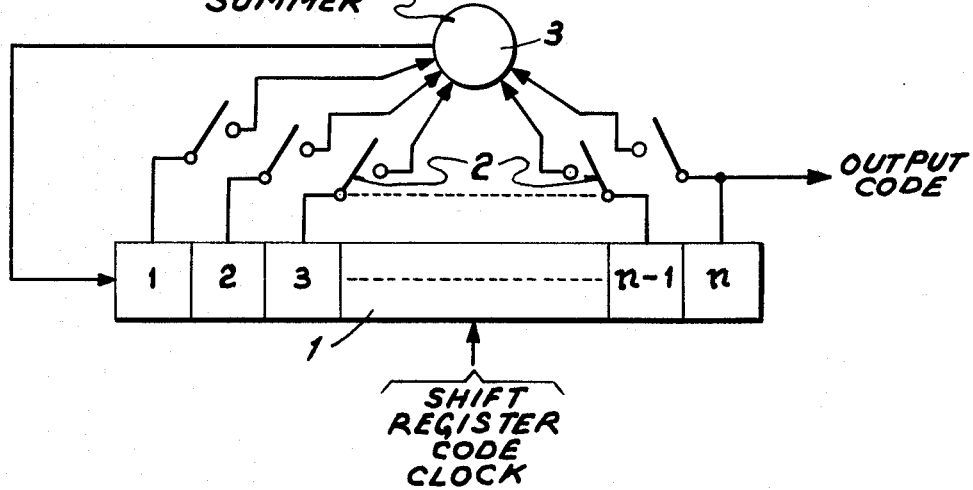
FIG. 1 is a block diagram of a conventional code generator using a single linear feedback shift register.

FIG. 1 is a block diagram of a simple conventional code generator employing a single linear feedback shift register. Shift register 1 has n binary stages which are set to some non-arbitrary starting (epoch) state. Depending upon the desired code structure to be output by the code generator, some number of particular tap switches 2 are closed providing their outputs to a modulo-2 (EXCLUSIVE-OR) summer 3. The modulo-2 summer then presents a new binary bit to the input of the first stage of the shift register 1. Upon the occurrence of the next shift register clock pulse this bit is shifted into the first stage of the shift register 1, and all other previous bits are transferred to the next higher ordered bit positions of the shift register 1. This process is repeated for each consecutive clock pulse. The serial binary code pattern is usually, but not necessarily, observed at the last tap output. Depending upon feedback tap selection, unique non-repeating binary codes of length $2^2-1$ bits can be obtained. After $2^n$ clock pulses have occurred, the shift register 1 will have returned to its initial starting state and the processes can be repeated.

It can be seen that any intermediate state of the shift register 1 has been determined from a history of all preceding states from the time of the initial or epoch state. Accordingly, to preset the code generator to an intermediate arbitrary state requires initialization to an epoch state and then application of the required number of clock pulses to arrive at the intermediate state.

Figure 2:
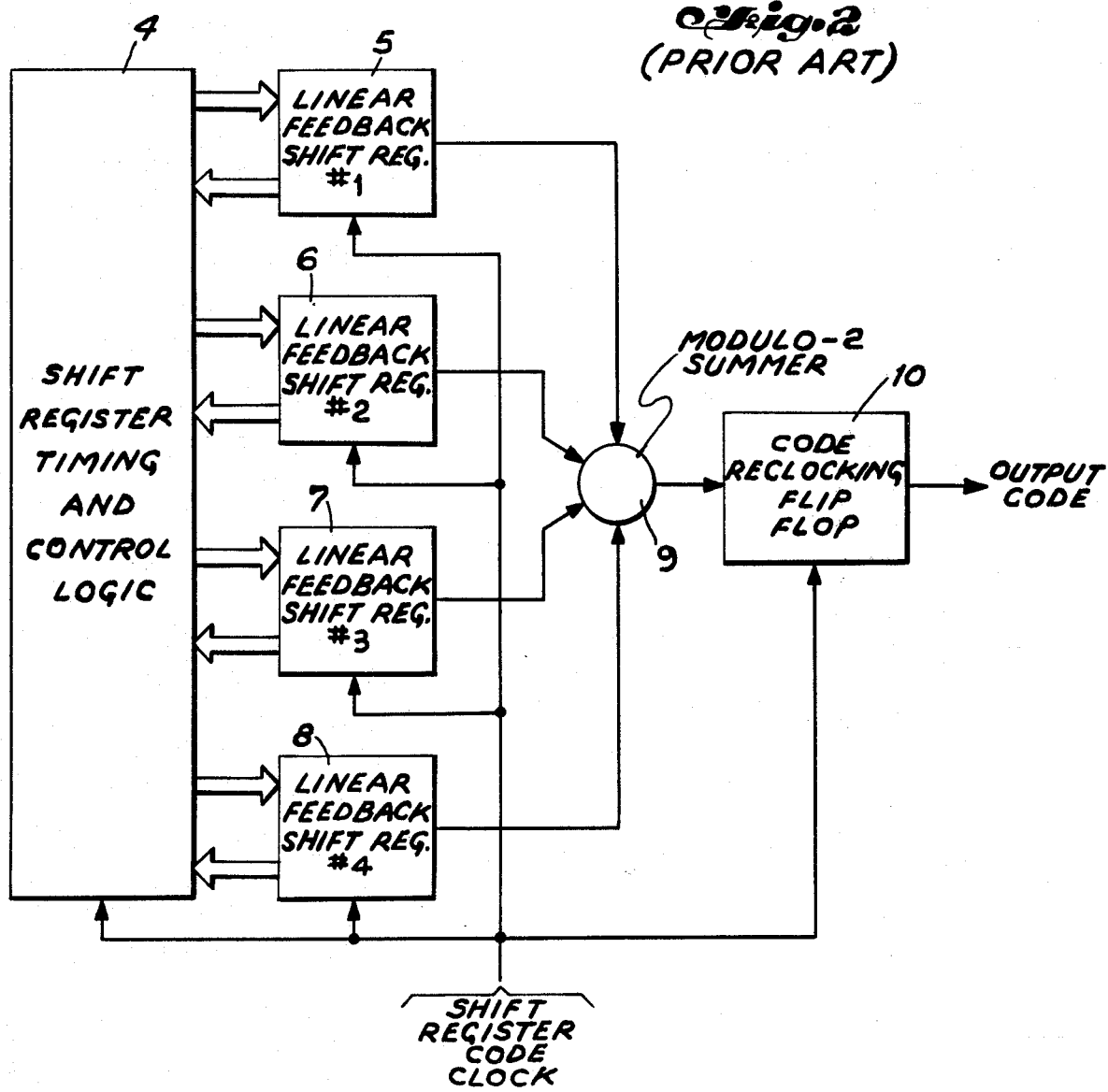
FIG. 2 is a block diagram of a conventional code generator using multiple linear feedback shift registers.

FIG. 2 is a block diagram of a more complex code generator which uses (in this example) four linear feedback shift registers 5, 6, 7 and 8, each of which is similar to that shown in FIG. 1. The tap configuration and, in general, the length of the shift registers could be different for each. The simultaneous operation of the four linear feedback shift registers would be controlled by appropriate shift register timing and control logic 4, and the four resulting codes combined in a modulo-2 summer 9. Code generators of this type are used for producing very long non-repeating codes, or for producing a plurality of different codes by adjusting the various component code state relative timing. Precisely timed code relative to the code clock is obtained by the code reclocking flip-flop 10.

FIG. 3 is a block diagram of an agile code generator in accordance with the principles of the present invention in which each of the four linear feedback shift registers 5, 6, 7, and 8 of FIG. 2 have been replaced with digital memories 12, 13, 14, and 15 such as Read Only Memories, Random Access Memories and Programmable Read Only Memories. Each digital memory 12, 13, 14 and 15 contains the entire $2^n-1$ bit code sequence conventionally produced by each of the corresponding linear feedback shift registers 5, 6, 7, and 8. Since the entire time ordered code sequence for each of the four component codes are immediately available in the digital memories 12, 13, 14 and 15 the required output code can be obtained immediately within one code clock interval by addressing the digital memories 12, 13, 14 and 15 in direct proportion to the number of code bits from an epoch state as required. Once the initial addresses are established, they need only be incremented by conventional digital memory addressing, timing and control logic 11 using well known and understood binary counting or addition techniques. As each digital memory 12, 13, 14 and 15 reaches its highest or last significant code bit memory cell, the respective addressing counter is reset to zero and up-counting continues as before. The output of each digital memory 12, 13, 14 and 15, is combined in modulo-2 summer 16 and either reclocked by the code reclocking flip-flop 17 as was done in the conventional code generator design shown in FIG. 2, or optionally provided to the untimed code output through switch 18 depending upon the particular application.

As an additional advantage at the option of the designer, digital memories may be selected which output groups of adjacent bits or words upon the application of a single address. Use of this parallel technique increases the ability of the agile code generator to output more code information in a given time without significant increase in hardware complexity. If this option is chosen, the modulo-2 summer 16 will provide the parallel sum of the output words from the digital memories 12–15 which would subsequently be provided at either the untimed code output through switch 18, or at the timed code output through a parallel set of code reclocking flip-flops 17 as required by the particular application. This feature is of particular importance in high code rate systems and/or multichannel systems where it is desired to use a single, agile code generator.

Another feature further enhancing the flexibility of the agile code generator is the fact that electrically programmable digital memories may be selected if desired which allow the component code sequences to be erased and reprogrammed differently without a hardward change impact. In fact, since any code sequence can be stored in the memories, the code sequences need not be restricted to linear sequences. (The examples shown previously were examples of linear codes due to the linear modulo-2 summing of the shift register taps.)

While we have described above the principles of our invention in connection with specific apparatus it is to be clearly understood that this description is made only by way of example and not as a limitation to the scope of our invention as set forth in the objects thereof and in the accompanying claims.

We claim:

1. A highly agile code generator for encoding and decoding information in secure and spread spectrum communication, navigation and data handling systems comprising:
   a plurality of first means each storing at least one binary code sequence;
   second means coupled in common to each of said plurality of first means for addressing each of said plurality of first means; and
   third means coupled in common to each of said plurality of first means to modulo-2 add said binary code sequences together to provide a pseudo random noise code sequence output from said generator.

2. A code generator according to claim 1, wherein each of said plurality of first means includes
   a digital memory coupled to said second means.

3. A code generator according to claim 2, wherein said third means includes
   a modulo-2 summer coupled to the output of each of said digital memories, and
   a code reclocking flip-flop coupled to said summer.

4. A code generator according to claim 2, wherein said third means includes
   a modulo-2 summer coupled to the output of each of said digital memories.

5. A code generator according to claim 1, wherein said third means includes
   a modulo-2 summer coupled to each of said plurality of first means, and
   a code reclocking flip-flop coupled to said summer.

6. A code generator according to claim 1, wherein said third means includes
   a modulo-2 summer coupled to each of said plurality of first means.

* * * * *